US006722726B1

(12) United States Patent
Parmer

(10) Patent No.: US 6,722,726 B1
(45) Date of Patent: Apr. 20, 2004

(54) TOY-HAULING TENT TRAILER

(76) Inventor: Jim Parmer, 4308 E. Rockledge Rd., Phoenix, AZ (US) 85044

( * ) Notice: Subject to any disclaimer, the term of this patent is extended or adjusted under 35 U.S.C. 154(b) by 0 days.

(21) Appl. No.: 10/315,829

(22) Filed: Dec. 9, 2002

(51) Int. Cl.$^7$ .............................. B60P 3/363; B60P 3/34
(52) U.S. Cl. ....................... 296/157; 296/158; 296/168; 296/173; 296/26.02
(58) Field of Search ................................. 296/156, 157, 296/158, 159, 160, 168, 169, 172, 173, 176, 26.01, 26.02, 26.03, 26.08, 26.11, 26.12, 26.15

(56) References Cited

U.S. PATENT DOCUMENTS

| 1,422,498 | A | * | 7/1922 | Vint ............................ 296/172 |
| 1,437,172 | A |  | 11/1922 | Curtiss |
| 1,461,574 | A | * | 7/1923 | Caplan ........................ 296/169 |
| 1,476,051 | A | * | 12/1923 | Cassell ........................ 296/176 |
| 1,501,790 | A |  | 7/1924 | McClay et al. |
| 1,568,895 | A | * | 1/1926 | Lyons ........................... 296/173 |
| 1,750,128 | A | * | 3/1930 | Romine ........................... 410/2 |
| 1,826,480 | A | * | 10/1931 | Rappich ...................... 296/173 |
| 1,857,081 | A |  | 5/1932 | Fontaine |
| 1,964,894 | A | * | 7/1934 | Rohne ...................... 296/26.02 |
| 2,155,582 | A |  | 4/1939 | Bond |
| 2,167,557 | A |  | 7/1939 | Stout |
| 2,541,288 | A |  | 2/1951 | Rice |
| 2,543,349 | A | * | 2/1951 | Britton ........................ 414/559 |
| 2,676,839 | A |  | 4/1954 | Lacoste |
| 2,847,136 | A | * | 8/1958 | Neff .............................. 296/157 |
| 2,912,274 | A | * | 11/1959 | Falkner ........................ 296/172 |
| 3,116,949 | A | * | 1/1964 | Muse ............................ 296/157 |
| 3,144,150 | A | * | 8/1964 | Cox ............................ 280/414.1 |
| 3,179,462 | A | * | 4/1965 | Hagen ......................... 296/157 |
| 3,193,321 | A | * | 7/1965 | Rose ............................ 296/157 |
| 3,397,006 | A |  | 8/1968 | Grant |
| 3,448,875 | A | * | 6/1969 | Robinson, Jr. .............. 414/542 |
| 3,784,248 | A | * | 1/1974 | Neuman ....................... 296/157 |
| 3,845,980 | A | * | 11/1974 | Grabast ........................ 296/168 |
| 3,902,613 | A |  | 9/1975 | Newland |
| 3,961,716 | A |  | 6/1976 | Renaud |
| 4,060,036 | A | * | 11/1977 | Palms ............................ 410/21 |
| 4,072,337 | A | * | 2/1978 | Barker ......................... 296/163 |
| D249,667 | S |  | 9/1978 | Thompson |
| 4,854,631 | A |  | 8/1989 | Laursen |
| 4,869,545 | A | * | 9/1989 | Notermann .................. 296/157 |
| 5,314,200 | A |  | 5/1994 | Phillips |
| 6,017,080 | A |  | 1/2000 | Gill |
| 6,135,532 | A |  | 10/2000 | Martin |
| 6,164,882 | A | * | 12/2000 | Selle ............................. 410/3 |
| 6,170,502 | B1 |  | 1/2001 | Pullen |
| 6,283,536 | B1 |  | 9/2001 | Muzyka et al. |
| 6,402,446 | B1 | * | 6/2002 | Nadherny et al. ........... 410/100 |
| 6,481,941 | B2 | * | 11/2002 | Nadherny et al. ........... 410/114 |

* cited by examiner

Primary Examiner—D. Glenn Dayoan
Assistant Examiner—Patricia L. Engle
(74) Attorney, Agent, or Firm—Schmeiser, Olsen & Watts, LLP

(57) ABSTRACT

The invention is a toy-hauling tent trailer, designed to store, transport, and launch motorized toys such as jet skis, snowmobiles, and all-terrain vehicles. The invention comprises a trailer chassis and a tent attached to the chassis. The tent is designed to be stowed on the chassis and erected on or around the chassis. The tent includes an interior space for containing toys in both the stowed and erected positions of the tent. Roof and floor extensions unfold to increase the interior space when the tent is erected. The center section of roof raises to provide adequate head room for standing. The floor has integral tie-down strips that also serve as flooring supports. In both the folded and unfolded state, the interior space is ventilated and drained to the outside.

29 Claims, 6 Drawing Sheets

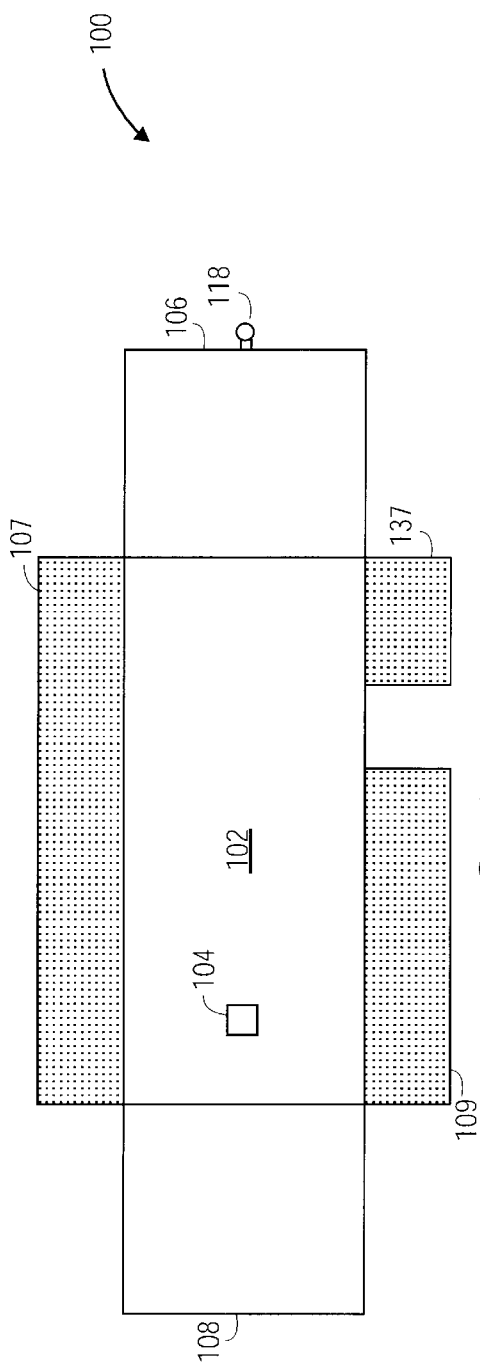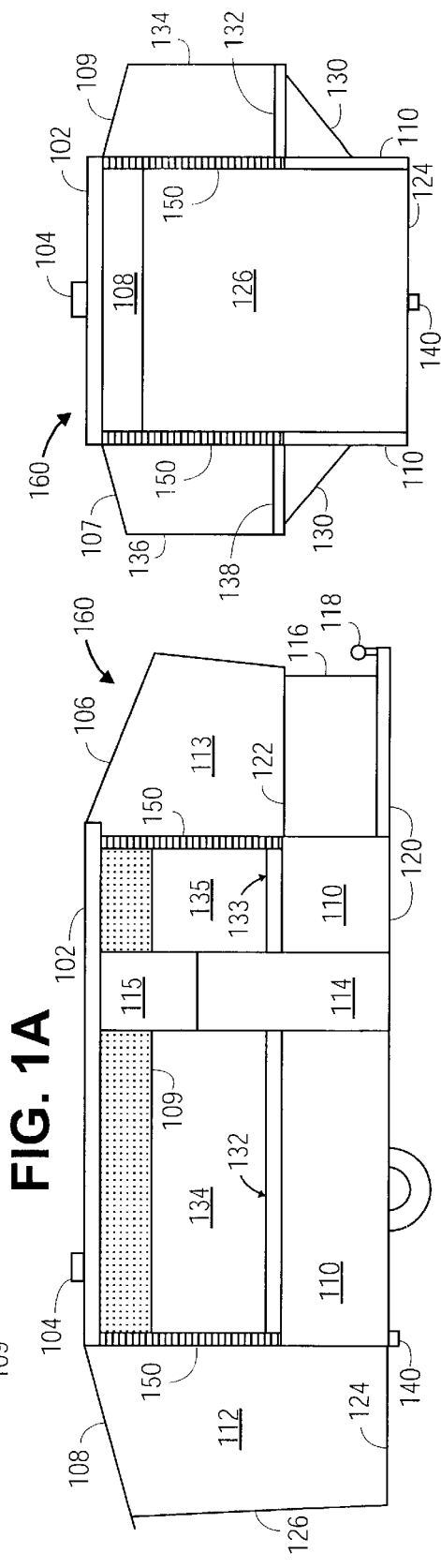

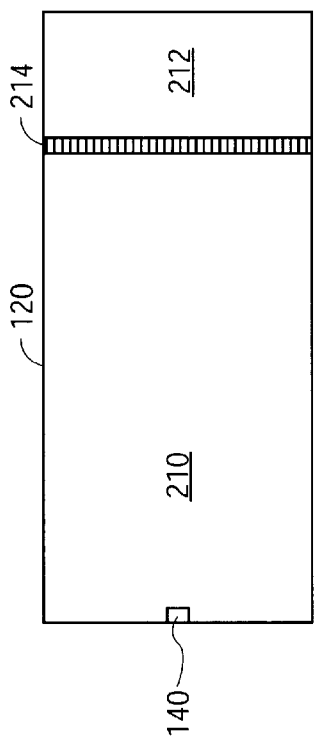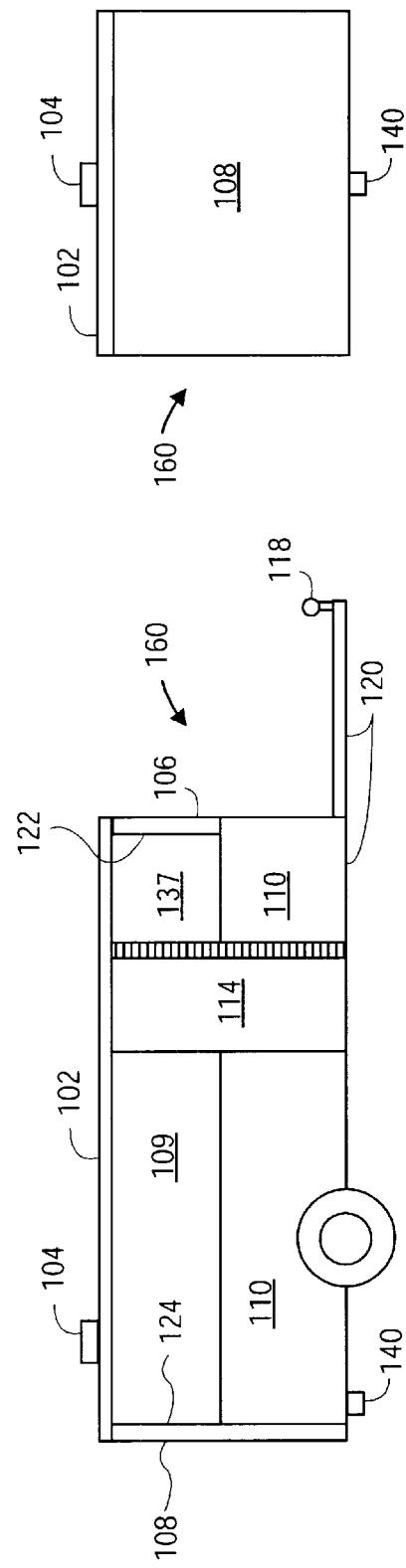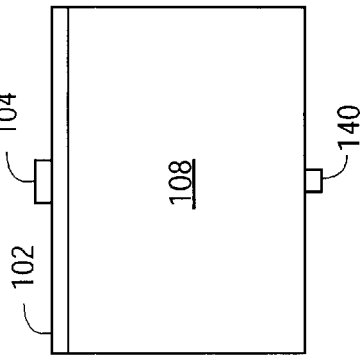

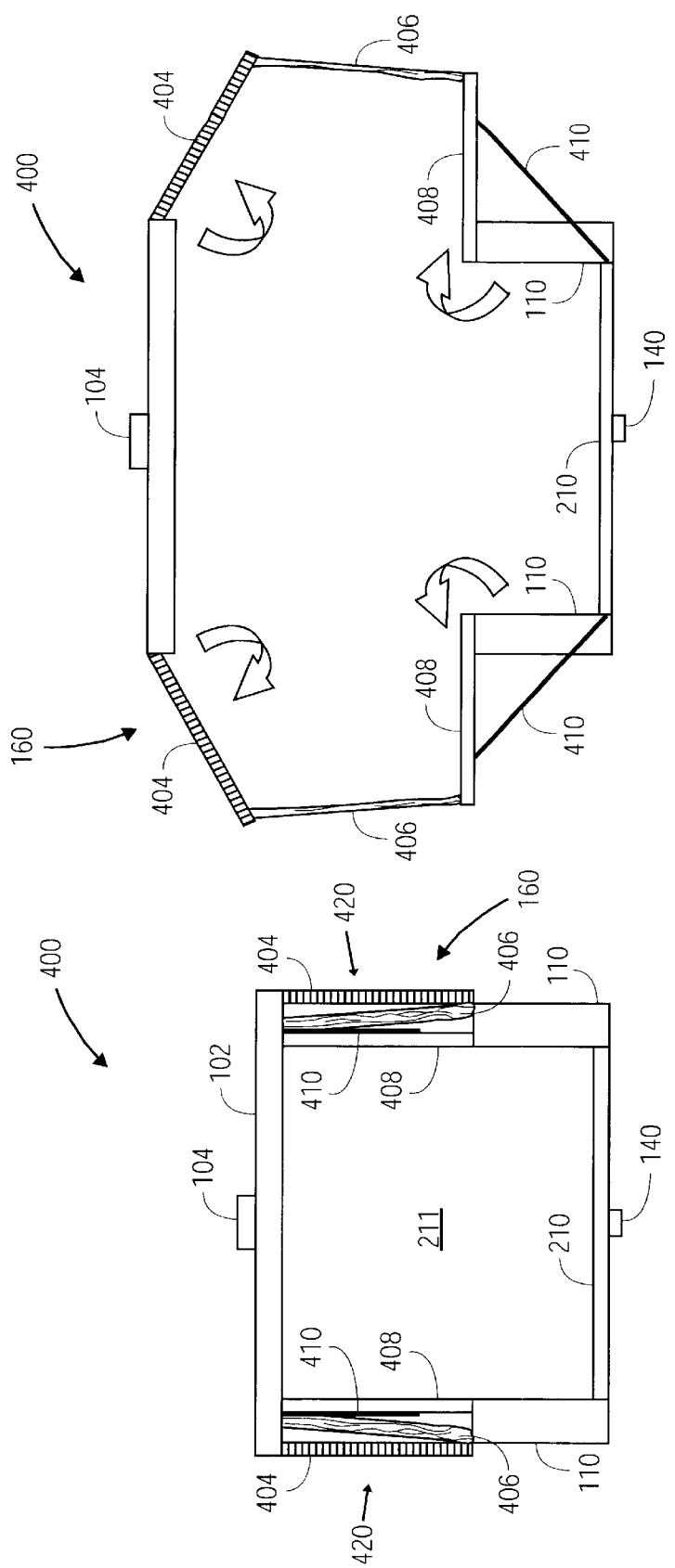

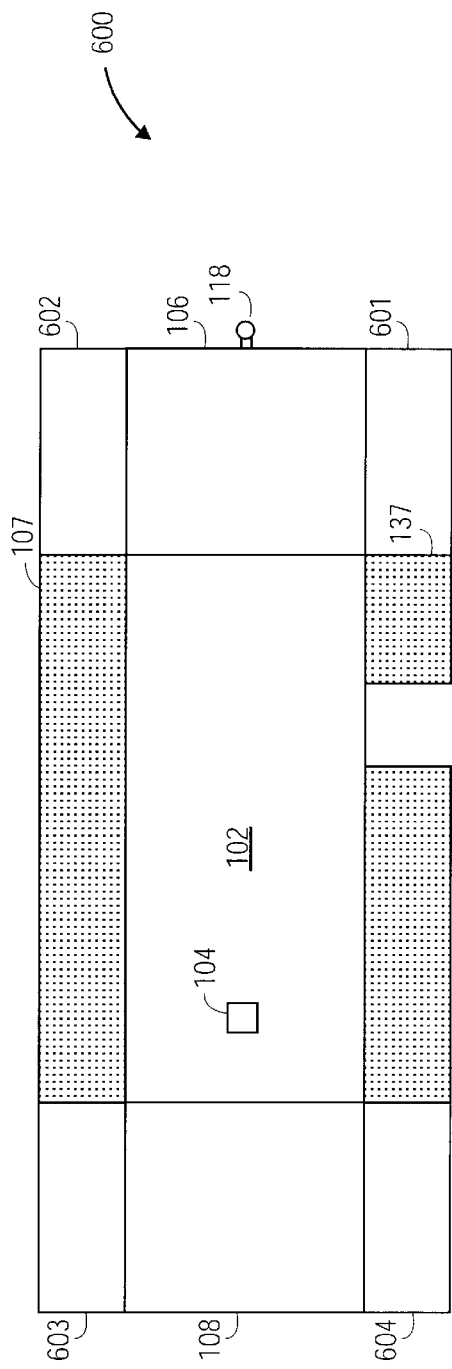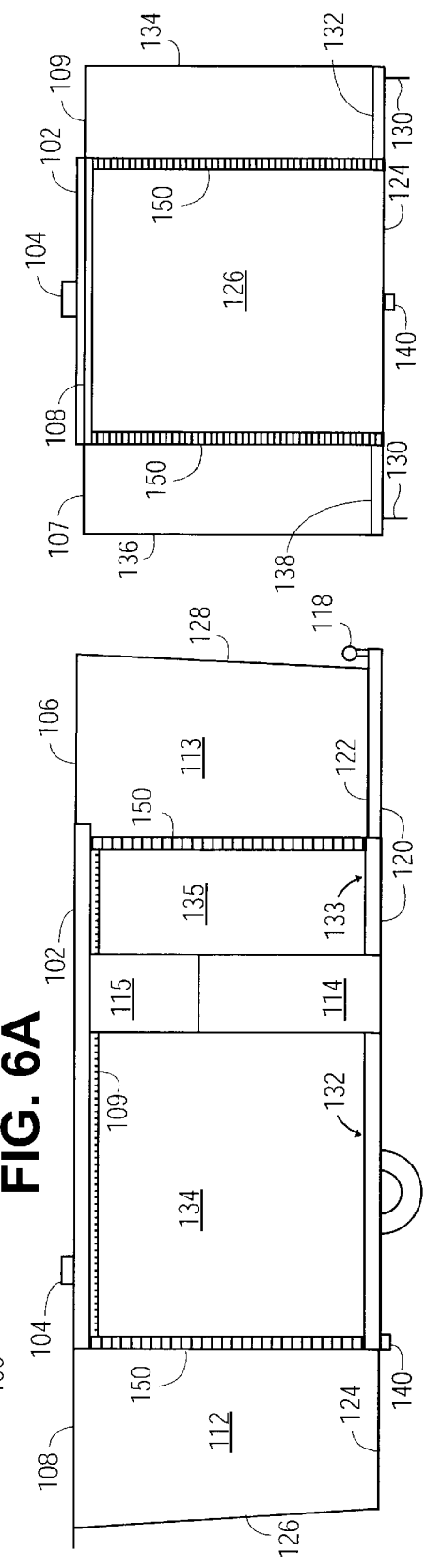

TOY-HAULING TENT TRAILER

BACKGROUND OF THE INVENTION

1. Technical Field

This invention relates generally to tent trailers specially adapted to perform additional functions. It relates more specifically to tent trailers adapted to transport and launch motorized "toys" such as jet skis, dirt bikes, snow mobiles, dune buggies, sand rails, all-terrain vehicles, quad runners and the like.

2. Background

Many areas suitable for riding snow mobiles, quad runners, and similar toys are remote, unimproved areas. The problem of transporting toys to the remote area and the problem of lodging at the remote area arise simultaneously. One solution has been "toy haulers," which are conventional large travel trailers with hard sides and ceilings and floor area allocated for toys. One disadvantage of current toy haulers is the large size, which impacts zoning laws regarding storage in many neighborhoods and which may limit access to some remote areas. Another disadvantage is the high cost. Yet another disadvantage is the weight, which typically requires a large, expensive pickup truck to pull the toy hauler, especially in mountainous terrain.

Accordingly, what is needed is a toy-hauler at a lower cost and at a size that is compatible with zoning laws and narrow, unimproved roads. Also needed is a toy hauler that is light-weight.

SUMMARY OF THE INVENTION

Accordingly, the invention is a toy-hauling tent trailer, adapted to store and launch motorized adult riding toys such as jet skis, quad runners, snowmobiles, dirt bikes, dune buggies, all-terrain vehicles and the like (hereinafter "toys"). The toy-hauling tent trailer comprises a trailer chassis and a tent, wherein the tent has an interior toy space in both the stowed and erected positions of the tent. The toy-hauling tent trailer may be folded closed to have a height under six feet for launching, transporting and storing toys. In erecting the tent, the tent unfolds by pivoting outer side and end panels upward to form additional roof in up to four directions, and by pivoting inner side and end panels downward to form additional floor space. One or more sections of the unfolded floor space may pivot further to serve as a ramp for loading and launching toys. The walls in the unfolded open position are at least partially tent walls, which may have doors and windows. A roof extension, an associated floor extension, and the tent material extending between them may be prefabricated as modular folding wall units, optionally with extendable frames. The center section of roof raises to provide adequate head room for standing. The floor has integral tie-down strips that also serve as flooring supports, or joists. In both the folded and unfolded state, the interior space is vented and drained to the outside. The interior space may contain one or more partitions separating the toy hauling space from a clean cargo space. The toy-hauling tent trailer may be used with the roof raised and the sides remaining stowed for carrying covered taller cargo.

BRIEF DESCRIPTION OF THE DRAWINGS

The foregoing and other features and advantages of the toy-hauling tent trailer will be apparent from the following more particular description of specific embodiments of the toy-hauling tent trailer, as illustrated in the accompanying drawings, wherein:

FIGS. 1A–C are top, side, and rear views of an embodiment of the toy-hauling tent trailer in the erected position of the tent;

FIG. 2A is a view of the interior floor configured according to an embodiment of the toy-hauling tent trailer;

FIG. 2B is a side view of an embodiment of the toy-hauling tent trailer in the stowed position of the tent;

FIG. 2C is a rear view of an embodiment of the toy-hauling tent trailer in the stowed position of the tent;

FIG. 4A is a cross-sectional view through the toy space of an embodiment of the toy-hauling tent trailer in the stowed position of the tent;

FIG. 4B is a cross-sectional view through the toy space of an example of an embodiment of the toy-hauling tent trailer in the erected position of the tent;

FIGS. 6A–C are top, side, and rear views of an alternate embodiment of the toy-hauling tent trailer in the erected position of the tent;

DETAILED DESCRIPTION OF EMBODIMENTS OF THE INVENTION

Figure 3:
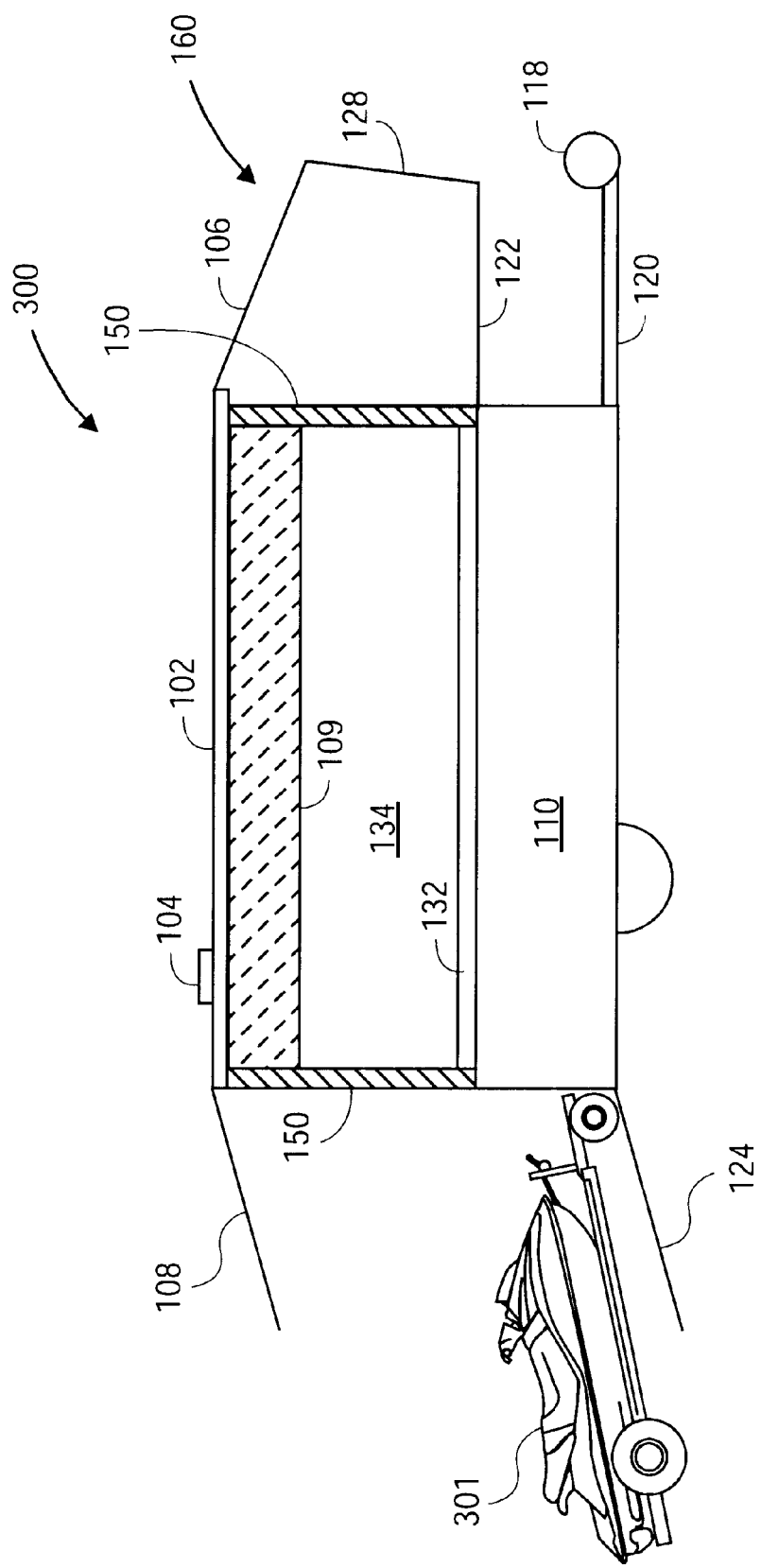
FIG. 3 is a side view of an exemplary toy being loaded into an embodiment of the toy-hauling tent trailer in the erected position of the tent.

Referring now to the figures, FIG. 1A is a top view of an exemplary embodiment of the toy-hauling tent trailer 100 in an erected position of the tent 160. Center roof section 102 may be a rigid web supported by extendable posts 150 (FIG. 1B). In some embodiments, center roof section 102 may be flexible tent material, such as canvas, nylon, cotton duck, or polyethylene, on a frame. The flexible tent material may be of different inner and outer layers, as is known in the art of tent making. Vent 104 in center roof section 102 may reduce the build up of fuel fumes in toy space 211 (FIG. 4A). In some embodiments, center roof section 102 may be made of several panels of different materials. For example, a translucent panel may be included as a sky light. Center roof section 102 is the top of the toy-hauling tent trailer 100 in the stowed position of the tent.

Front roof extension 106 may be flexibly connected to center roof section 102. For example, a piano hinge may be used, with a flexible waterproof fabric covering to prevent rain from leaking inside the tent. In some embodiments, the connection may be made on the underside of center roof section 102, an inch or so inward from the edge, to give some rain protection without the need for a flexible waterproof fabric covering. Front roof extension 106 may be maintained in its erected position by any conventional erecting gear. For example, the latches used for extending and locking table leaves may be used. Braces will also serve the purpose. For further example, slotted braces secured with wing nuts on anchored bolts through the slots may allow the user to vary the slope of the front roof extension 106. In other embodiments, hydraulic or pneumatic struts may be used for braces. Front roof extension 106 may be a single panel or web. In some embodiments, front roof extension 106 may itself be a series of articulated panels that may unfold to cover a larger area. Such panels may be folded up, accordion-style, in the stowed position of the tent 160. The length of front roof extension 106 for stowing, whether a single piece or not, is limited by the height of the toy-hauling tent trailer 100. Front roof extension 106 is the forward face of the toy-hauling tent trailer 100 in the stowed position. Accordingly, the length of stowed front roof extension 106 covers no greater distance than from the top of the toy-hauling tent trailer 100 to the trailer chassis 120. Front roof extension 106 has edges not connected to center roof section 102. Front roof extension 106 engages tent material 113 along those edges.

Rear roof extension 108 may be configured the same as front roof extension 106 as to the sizing, erecting gear, tent material attachment, and embodiments having accordion-style extendable panels. In a particular embodiment, the rear roof extension 108 may have a license plate holder, brake lights, and running lights on the outside surface.

Side roof extension 107 may be configured the same as front roof extension 106 as to the sizing, erecting gear, tent material attachment, and embodiments having accordion-style extendable panels. Side roof extension 109 may also be configured the same as front roof extension 106 as to the sizing, erecting gear, tent material attachment, and embodiments having accordion-style extendable panels. The length of side roof extension 109 may be less than the length of the trailer frame 120 to accommodate a door 114 (FIG. 1B). A second side roof extension 137, similar to side roof extensions 107 and 109, may be used on the same side of the toy-hauling tent trailer 100 but on the other side of the door.

FIG. 1B shows a side elevation view of an exemplary toy-hauling tent trailer 100 in the erected position. Trailer chassis 120, has trailer hitch 118, wheels, and a frame which defines the bottom perimeter of the toy-hauling tent trailer 100 and the floors 210 and 212 (FIG. 2A) within. Lower side walls 110 may be rigidly attached to frame 120 and may include a front lower sidewall as well. Side extension panels 107, 109, and 137 need not be as long as aft roof extension 108 in embodiments 100 with lower side walls 110 because the side extension panels 107, 109, and 137 need only be long enough to reach the top of the lower side wall in the stowed position (FIG. 2B). In other embodiments, the side extension panels 107, 109, and 137 may overlap the lower sidewalls 110. In some variations of such embodiments, the side extension panels 107, 109, and 137 may overlap the lower sidewalls 110 all the way to the bottom edge of trailer chassis 120.

Door 114 may be sized to be operable in the stowed position of the tent 160 (FIG. 2B). In the erected position of the tent 160, door extension 115 completes the closure of the door opening. Door extension 115 may be flexibly connected to door 114. In other embodiments, door extension 115 may slide, or telescope, down into a hollow door 114, or may be detachable to be stowed. In a variation of the telescoping door extension 115, the door extension 115 and a door frame may be attached to a center roof section 102 and may telescope together as the tent 160 is erected or stowed. Side roof extensions 109 and 137 may provide a gap above door 114, as shown. This permits operating the door 114 in the stowed position of the tent 160, because the roof extension panel 109 does not fold over the door 114. In a particular embodiment, where use of door 114 is not desired in the stowed position, side roof extension 109 may extend to the front end of the toy-hauling tent trailer 100, thereby providing a roof over the door 115. In yet another embodiment, side roof extension 109 may have its own articulated end roof extension which may be stowed without extending the length of side roof extension 109 but which may be erected to extend over the doorway. In some embodiments, the door may be located on the front, rear, or other side of the toy-hauling tent trailer 100. In some other embodiments the door 114 may be located,elsewhere on the side of toy-hauling tent trailer 100. In a particular embodiment, there may be no door 114.

In a particular embodiment, door 114 and door extension 115 may be made of tent fabric and connected by a zipper to allow use of just door 114 in the stowed position. In another particular embodiment, wherein the tent walls 134–135 extend down to the chassis 120, the door may be in tent wall 134–135, and not usable in the stowed position.

Center roof section 102 may be supported by extendable posts 150. The posts may be extended by telescoping and locking with a transverse pin or similarly effective lock at each telescoping joint. In a variation of the telescoping post 150, the posts may be pneumatically extended and retracted. In various alternate embodiments, the supports for center roof section 102 may be one or more scissor jacks, may be posts that are extended by adding additional sections using interlocking tapered joints, or may be posts extended by folding out and locking articulated sections. Embodiment 100 uses four corner posts, but other arrangements will occur to those skilled in the art of tent-making. For example, in a particular embodiment, the center roof section 102 may be supported by external bowed crossing struts.

Tent walls 126 and 112, depend from the previously described roof extension 108 to engage rear floor extension 124. Floor extensions 124 folds out from the stowed position (FIG. 2B) on flexible connections, such as hinges, in a manner similar to erecting roof extensions 106–109 and 137, but are folded downward from vertical positions. (FIG. 4B). Floor extension 124 may be detached from tent walls 126 and 112 and further lowered to serve as a loading and launching ramp for toys (FIG. 3). Tent wall 126 may be equipped with a vertical zipper to allow the wall 126 to be opened for loading and launching toys. In some alternate embodiments, the ramp 124 and opening wall 126 may be on a side of the toy-hauling tent trailer 126. Rear floor extension 124 may have a high traction surface on the top side of the ramp 124 (FIG. 3). In a particular embodiment, the ramp 124 is a metal grating having an opening sufficient to let mud, snow, and debris fall through. In an embodiment, ramp 124 may comprise one or more tie-down strips. In an embodiment, floor extensions 124, 122, 138, and 132 may be supported by cables depending from posts 150.

Tent wall 134 depends from side roof extension 109 to engage side floor extension 132. Tent wall 134 extends around the ends of side roof extension 109 to enclose the exterior perimeter of the extended space between side floor extension 132 and side roof extension 109. Tent wall 135 is similarly configured between side roof extension 137 and side floor extension 133. Tent wall 113 is also similarly configured between front roof extension 106 and front floor extension 122. Front floor extension may be braced against the trailer chassis 120 with brace 116. Other floor extensions may also be braced. Side floor extensions 138 and 132 may be braced against lower side walls 110 using braces 130 (FIG. 1C). In some embodiments, braces 130 brace against the chassis 120 or the ground. Rear floor extension 124 may be braced against the ground. The chassis 120 may include leveling equipment for erecting the toy-hauling tent trailer 100.

In embodiment 100, tent walls 126, 112, 134, 135, 136, and 113 are made of tent fabric. For example, canvas, cotton duck, nylon, or polyethylene may be used, as well as any of the modern specialized tent fabrics. In an alternate embodiment, the tent walls 126, 112, 134, 135, 136, and 113 may be made of articulated accordion-style panels.

FIG. 1C shows a rear elevation view of exemplary toy-hauling tent trailer 100. Vent 104 and drain 140 are open to the toy space 211 (FIG. 4A) in both the erected and stowed positions of the tent 160. Side floor extensions 138 and 132 are flexibly connected to the tops of the rigid lower side walls 110. In some embodiments, there are no lower sidewalls 110 and side floor extensions 138 and 132 are flexibly connected to the chassis 120. In a particular embodiment, side floor extensions 138 and 132, with lockable articulated panels, may be erected at a level lower than the chassis 120.

FIG. 2A shows a plan view of an exemplary center floor section 210 and 212. The floor 210 of toy space 211 may be separated from floor 212 of the clean cargo space by a partition 214. Exemplary drain 140 may be used to discharge water and mud that drips from toys after use. It may also be used when washing out the toy space with a hose. In some embodiments, the drain 140 extends entirely across the rear end of the toy-hauling tent trailer 100. In a particular embodiment, drain 140 may be a plurality of individual drains.

FIG. 2B shows a side elevation view of the exemplary embodiment of the toy-hauling tent trailer 100 in the stowed position of the tent 160. Rear floor extension 124, or ramp 124, is shown folded up to its stowed position. Rear roof extension 108 is shown folded down to form the rear wall of the toy-hauling tent trailer 100 in the stowed position of the tent 160. Tent walls 126 and 112 may be stowed between and still attached to rear floor extension 124 and rear roof extension 108. The rear of the toy-hauling tent trailer 100 may be opened in the stowed position to load or launch a toy. Side wall extensions 109 and 137 are shown folded down to form a top portion of the sidewall of the toy-hauling tent trailer 100 in the stowed position of the tent 160. Door extension 115 (FIG. 1B) has been stowed within or behind door 114. Front floor extension 122 has been folded up and front roof extension 106 folded down over it to form the front wall of the toy-hauling tent trailer 100 in the stowed position of the tent 160. In the stowed position of the tent 160, the toy-hauling tent trailer 100 is short enough, usually no more than six feet high, to comply with zoning ordinances regarding stored vehicles.

FIG. 2C is the rear elevation view of the tent 160 in the stowed position. Center roof section 102 is roof of the toy-hauling tent trailer 100 in the stowed position of the tent 160. Vent 104 and drain 140 are operable during stowage to prevent fuel fumes from accumulating in the toy space 211 above floor 210 (FIG. 4A).

FIG. 3 shows a toy 301 (a jet ski) being loaded into the toy-hauling tent trailer 300 in the erected position of the tent 160. As shown, the toy 301 is being loaded by rolling the toy 301 up ramp 124 on the toy's custom trailer. Within the toy-hauling tent trailer 300, the toy's separate trailer may be attached to tie-down strips 502 (FIG. 5), the trailer then serving as a holding fixture for the toy. In many embodiments, the toy 301 may be loaded without its own trailer. Many toys 301 have their own wheels. In a particular embodiment, a jet ski 301 may be launched from the toy-hauling tent trailer 300 directly into the water by backing the trailer down the loading ramp at a dock facility until the ramp 124 may be lowered to be partially in the water. The toy may then be slid out of the toy-hauling tent trailer 300 and into the water. In some embodiments, the ramp 124 or the floor 102 may comprise holding fixtures such as boat bunk glide-ons or bunk pads. In variations of these embodiments, the boat bunk glide-ons and bunk pads may be configured to be attachable to tie-down strips 502 (FIG. 5). In other embodiments, other holding fixtures adapted to a particular toy or type of toy may be integral to the floor 210 or ramp 124 or may be attachable to tie-down strips 502.

FIG. 4A shows a cross-sectional view through the toy space of an exemplary embodiment the toy-hauling tent trailer 400 in the stowed position of tent 160. Side roof extension 404 may be stowed on the outside of toy-hauling tent trailer 400 to form an upper portion of the outer side of the toy-hauling tent trailer 400. Side floor extension 408 may be stowed inside the toy-hauling tent trailer 400, placed to allow room for the tent wall 406 to be stowed between the roof extension 404 and the floor extension 408. Brace 410 is folded against floor extension 408 in the stowed position of tent 160. The space above floor 210 and below center roof section 102 is the toy space 211.

In some embodiments, roof extension panel 404 may overlap a portion of lower side wall 110. In such an embodiment, the posts 150 (FIG. 1B) or modular wall units 420 may be extended to raise center roof section 102 without unfolding the modular wall units 420. As the center roof section 102 is raised, roof extension panel 404 moves vertically upward, keeping tent wall 406 contained between roof extension panel 404 and floor extension panel 408. In such a configuration, taller cargo may be carried inside the toy-hauling tent trailer 400.

FIG. 4B shows a cross-sectional view of an exemplary embodiment the toy-hauling tent trailer 400 in the erected position of tent 160. Roof extensions 404 may pivoted up to their erected positions and floor extensions 408 may be pivoted down to their erected positions, thereby extending tent walls 406. Note that raising center roof section 102 by extending posts 150 (FIG. 1B) will necessarily accomplish some of this pivoting. Braces 410 are shown braced against the chassis 120.

In some embodiments, each set of roof extension 404, connected tent wall 406, and floor extension 408 may be formed as a modular folding wall unit 420. The modular folding wall unit 420 may be prefabricated for installation on a variety of lower side walls 110 or chassis 120. The modular folding wall unit 420 may incorporate the function of extendable posts 150 (FIG. 1B) in a frame for the modular folding wall unit 420. The frame may further provide flexible attachments to the roof extension 404 and the floor extension 408. Thus, the walls and ends of a toy-hauling tent trailer 400 could be fabricated as appropriately adapted modular folding wall units 420, attached at the edges which meet at the corners of the chassis frame 120. A center roof section 102 could then be attached to the plurality of modular folding wall units 420 and the center roof section 120 would be raised when the modular folding wall units 420 were erected.

Figure 5A:
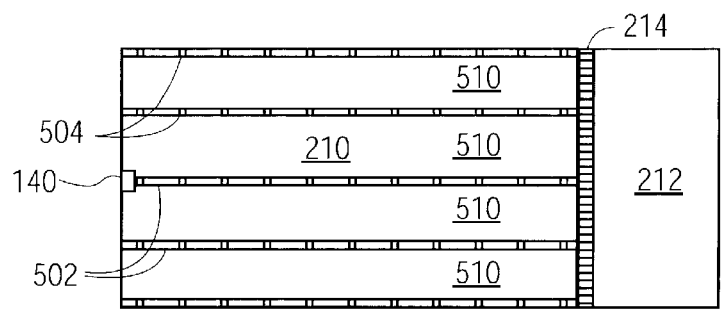
FIG. 5A is a top plan view of the floor space of an embodiment of the toy-hauling tent trailer showing an exemplary configuration of a grid of tie-down strips.

FIG. 5A shows an exemplary embodiment of floor 210 comprising an exemplary grid of tie-down strips 502 and flooring panels 510. The flooring panels 510 can be made of wood or synthetic flooring. The tie-down strips 502 provide points of attachment for tie-down strap hooks 520 (FIG. 5C) which may be used to prevent the toy 301 (FIG. 3) from moving around in the toy space when the toy-hauling tent trailer 100 is being towed. The tie-down strips 502 additionally serve as floor joists for the center floor section 210, supporting flooring panels 510 and supported by attachment to the chassis 120 (FIG. 1B). Each tie-down strip 502 comprises a plurality of tie-down bars 504. In a particular embodiment, the tie-down strips 502 may be oriented transversely, rather than longitudinally, as shown. In various alternate embodiments, the tie-down strips 502 may be shaped, may interconnect, and may be of various sizes.

Figure 5B:
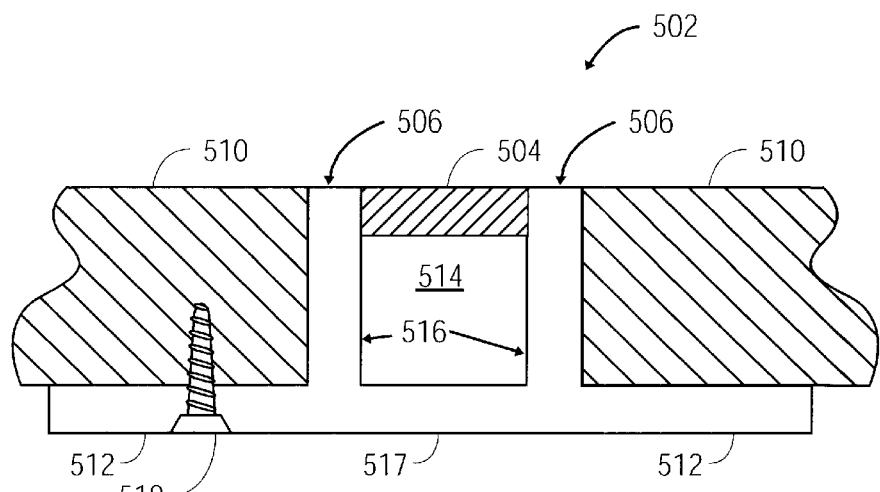
FIG. 5B is a transverse cross sectional view of an example of a tie-down strip for an exemplary embodiment of the toy-hauling tent trailer.

FIG. 5B shows a cross-sectional elevation view of an exemplary tie-down strip 502. Tie-down strip 502 comprises a channel 514 bounded by inner wall surfaces 516 and base 517. Tie-down bars are attached within the channel 514 and fixed to the inner wall surfaces 516. Flanges 512 extend from the base 512 to support flooring panels 510. Flooring panels 510 may be attached to flanges 512. For example, a plurality of screws 518 may attach flooring panel 510 to flange 512. Other conventional methods of attachment are also contemplated.

The channel 514 and flanges are sized and shaped to put the top surfaces 506 of the channel walls flush with the top surfaces of the flooring panels 510. In a particular embodiment, the top surfaces 506 may be finished or coated to create high-friction surfaces. In some embodiments, the tie-down bar 504 may be below the top of the channel 514. The flanges 512 and/or the base 517 may be adapted to be attached to the chassis 120 and to serve as floor joists. For example, attachment flanges 512 for bolting or welding, adapted to a particular chassis 120, may extend from the base 517. In an alternate embodiment, the channel 514 does not have a constant depth, but slopes downward to a drain 140 to allow water dripping from the toy 301 (FIG. 3) to drain from the channel 514. In another alternate embodiment, floor 210 may be slightly sloped to enable channels 514 of constant depth to drain floor 210.

Figure 5C:
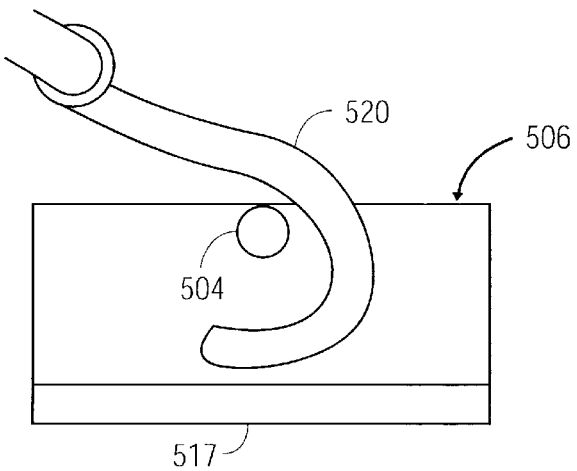
FIG. 5C is a longitudinal cross sectional view of an example of a portion of a tie-down strip for an exemplary embodiment of the toy-hauling tent trailer.

FIG. 5C shows a cross section view through the longitudinal center line of a tie-down strip. The channel 514 may be sized to enable a conventional tie-down hook 520 to engage the tie down bar 504.

FIG. 6A shows a top plan view of an alternate exemplary embodiment of the toy-hauling tent trailer 600. Front and rear roof extensions 106 and 108 have side extensions 601, 602 and 603, 604, respectively. These side extensions 601–604 fold out when erected to engage side extension panels 107, 109, and 137 to make a larger roof. Floor extension panels 124 and 122 are similarly configured.

FIG. 6B shows a side elevation view of the alternate exemplary embodiment of the toy-hauling tent trailer 600. This embodiment lacks lower side walls 110 (FIG. 2B). The floor extensions 124, 132, 133, 122, and 138 attach to the chassis 120. Tent walls 113, 134, 135, 136, and 128 extend downward from the roof extensions to engage their respective floor extension panels.

The foregoing description has described selected embodiments of a toy-hauling tent trailer. While the invention has been particularly shown and described with reference to selected embodiments thereof, it will be readily understood by one of ordinary skill in the art that, as limited only by the appended claims, various changes in form and details may be made therein without departing from the spirit and scope of the invention. For example, the lower side walls 110 may comprise tie-down strips 502. Likewise, a truck chassis may be substituted for a trailer chassis 120.

I claim:

1. A toy-hauling tent trailer comprising:
    a trailer chassis, the trailer chassis comprising a frame, the frame defining edges of a center floor section, the center floor section comprising:
        at least one tie-down strip attached to the trailer chassis within the boundaries of the frame, the tie-down strip adapted to serve as at least one floor joist to at least partially support at least one floor pane, wherein the at least one tie-down strip comprises a channel, the channel comprising:
            a base comprising a substantially rigid elongated member;
            two mutually spaced-apart substantially parallel vertical sides extending upward from the base, the sides engaging opposite ends of a plurality of mutually parallel and mutually spaced apart tie-down bars;
            a depth of the channel and the positions of the tie-down bars selected to allow at least one tie-down hook to engage at least one tie-down bar;
            a width of the channel sized to be compatible with receiving a tie-down hook; and
            a plurality of flanges, the flanges extending horizontally outward from the base, the distance from a top of the flange to a top of the sides of the channel sized to prevent the sides of the channel from extending beyond a top of a flooring panel that is resting on a top of the flange, the flanges adapted to attach to the flooring panel and the chassis;
    a tent, adapted to be stowed on the trailer chassis and to be erected at least one of on and around the trailer chassis; and
    a toy space, the toy space sized and shaped for containing at least one motorized adult riding toy, the toy space comprising a space interior to the tent in both the stowed and the erected positions of the tent,
    wherein the toy space comprises a space accessible through at least one of a pivoting roof panel, a pivoting floor panel, and a tent wall opening for both loading and launching the at least one motorized adult riding toy, the toy space accessible in both the stowed and the erected positions of the tent.

2. The toy-hauling tent trailer of claim 1, wherein the at least one tie-down strip comprises a plurality of tie-down strips, the plurality of tie-down strips further comprising a grid of mutually spaced-apart tie-down strips.

3. The toy-hauling tent trailer of claim 2, wherein the at least one floor panel comprises a plurality of flooring panels, sized and shaped to cover openings in the grid of tie-down strips, the flooring panels comprising at least one of wood and synthetic flooring.

4. The toy-hauling tent trailer of claim 2, further comprising a toy-holding fixture at least one of integral to the at least one tie-down strip and attachable to the at least one tie-down strip.

5. The toy-hauling tent trailer of claim 1, wherein the at least one tie-down strip comprises a high traction surface on top surfaces of the sides of the tie-down strip.

6. The toy-hauling tent trailer of claim 1, wherein the at least one tie-down strip comprises a uniformly increasing depth towards an open end of the channel, operative to drain spilled liquids out of the tent.

7. A toy-hauling tent trailer comprising:
    a trailer chassis, the trailer chassis comprising a frame, the frame defining edges of a center floor section;
    a tent adapted to be stowed on the trailer chassis and to be erected at least one of on and around the trailer chassis, wherein the tent comprises:
        at least one outer surface, the outer surface comprising at least one web of at least one of rigid materials and flexible materials;
        a tent frame, the tent frame attached to the chassis, the tent frame comprising at least one extendable roof support, the tent frame adjustable to raise or lower a center roof section;

a plurality of modular folding wall units, each modular folding wall unit comprising:

a first rigid panel comprising a floor extension, the first panel adapted to be moveably connected along a first edge of the first panel to at least one of the trailer chassis, the tent frame, a wall unit frame, and a rigid lower wall portion, at least one second edge of the first panel further detachably connected to a flexible tent wall;

a second rigid panel comprising a roof extension, the second panel adapted to be moveably connected along a first edge of the second panel to at least one of the center roof section, a wall unit frame and the tent frame, the second panel detachably connected on at least one second edge of the second panel to a flexible tent wall section;

the flexible tent wall section extending when erected between the at least one second edge of the first panel and the at least one second edge of the second panel, the flexible tent wall section adapted to be folded between the first panel and the second panel when stowed; and at least one rigid brace, moveably attached to the first panel, sized and shaped to engage at least one of the rigid lower wall portion, the trailer chassis, and the ground, and adapted to support the first panel when the first panel is erected as a portion of tent flooring;

wherein at least one of the first rigid panel and the second rigid panel comprises an articulated panel, the articulated panel operable to unfold to a size greater than its stowed dimensions;

the center floor section; and the center roof section, the center roof section comprising a vent, the vent operable to vent fumes from the toy space in both stowed and erected positions of the tent; and a toy space, the toy space sized and shaped for containing at least one motorized adult riding toy, the toy space comprising a space interior to the tent in both the stowed and the erected positions of the tent, wherein the toy space comprises a space accessible through at least one of a pivoting roof panel, a pivoting floor panel, and a tent wall opening for both loading and launching the at least one motorized adult riding toy, the toy space accessible in both the stowed and the erected positions of the tent.

8. The toy-hauling tent trailer of claim 7, wherein the modular wall unit frame comprises a rectangular frame extendable and lockable in the vertical direction, the wall unit frame operable to maintain the first and second panels in a spaced-apart relationship, the wall unit frame engaging vertical edges of the flexible tent wall section, the wall unit frame attachable to at least one of the trailer chassis and the tent frame.

9. The toy-hauling tent trailer of claim 8, wherein the wall frames of a plurality of modular folding wall units interconnect, the interconnected plurality of wall frames comprising the tent frame.

10. The toy-hauling tent trailer of claim 7, wherein the center roof section comprises a substantially rigid structure.

11. A toy-hauling tent trailer comprising:

a trailer chassis, the trailer chassis comprising a frame, the frame defining edges of a center floor section;

a tent adapted to be stowed on the trailer chassis and to be erected at least one of on and around the trailer chassis, wherein the tent comprises:

at least one outer surface, the outer surface comprising at least one web of at least one of rigid materials and flexible materials;

a tent frame, the tent frame attached to the chassis, the tent frame comprising at least one extendable roof support, the tent frame adjustable to raise or lower a center roof section;

a plurality of modular folding wall units, each modular folding wall unit comprising at least one rigid panel and at least one web of flexible tent material, wherein at least one of the modular folding wall units is attached to each of two sides and each of two ends of the trailer chassis frame, and wherein at least one of the modular folding wall units comprises a first panel adapted to serve as a ramp for loading and launching toys;

the center floor section; and the center roof section, the center roof section comprising a vent, the vent operable to vent fumes from the toy space in both stowed and erected positions of the tent; and a toy space, the toy space sized and shaped for containing at least one motorized adult riding toy, the toy space comprising a space interior to the tent in both the stowed and the erected positions of the tent, wherein the toy space comprises a space accessible through at least one of a pivoting roof panel, a pivoting floor panel, and a tent wall opening for both loading and launching the at least one motorized adult riding toy, the toy space accessible in both the stowed and the erected positions of the tent.

12. The toy-hauling tent trailer of claim 11, wherein the ramp comprises a high-traction surface.

13. The toy-hauling tent trailer of claim 12, wherein the ramp comprises a grating.

14. The toy-hauling tent trailer of claim 11, wherein the height of the combined chassis and stowed tent is within a height limitation of six feet.

15. The toy-hauling tent trailer of claim 11, wherein the toy space comprises a space further defined by a flexible partition between the toy space and a second space within the toy-hauling tent trailer.

16. A toy-hauling tent vehicle comprising a wheeled chassis, the wheeled chassis comprising a frame, the frame defining a floor area;

at least one tie-down strip attached to the wheeled chassis, the tie-down strip adapted to support at least one floor panel, wherein the at least one tie-down strip comprises:

a channel, the channel comprising:

two spaced apart mutually parallel channel side walls;

a plurality of mutually parallel and mutually spaced apart bars attached to interior surfaces of the channel side walls; and a plurality of flanges, the flanges extending horizontally outward from the channel, the flanges adapted to attach to the at least one flooring panel, wherein top surfaces of the channel side walls are flush with a top surface of the at least one flooring panel;

a ventilated toy space adjacent to at least a portion of the at least one tie-down strip, the toy space sized and shaped to contain a motorized adult riding toy, the toy space being interior to the tent in both the stowed and erected positions of the tent; and a tent, the tent attached to a least one of the wheeled chassis and a structure attached to the wheeled chassis.

17. The toy-hauling tent vehicle of claim 16, wherein the at least one tie-down strip comprises a plurality of tie-down strips, the plurality of tie-down strips further comprising a grid of tie-down strips.

18. The toy-hauling tent vehicle of claim 16, wherein the wheeled chassis comprises at least one of a trailer chassis and a truck chassis.

19. A toy-hauling tent vehicle comprising:
a wheeled chassis, the wheeled chassis comprising a frame, the frame defining a floor area;
at least one tie-down strip attached to the wheeled chassis, the tie-down strip adapted to support at least one floor panel;
a ventilated toy space adjacent to at least a portion of the at least one tie-down strip, the toy space sized and shaped to contain a motorized adult riding toy, the toy space being interior to the tent in both the stowed and erected positions of the tent; and
a tent, the tent attached to a least one of the wheeled chassis and a structure attached to the wheeled chassis, wherein the tent comprises:
a roof, the roof comprising:
a first roof section;
at least one vent; and
a plurality of roof panels, the roof panels flexibly connected to the first roof section, the roof panels operable to be stowed below the first roof section in a stowed position of the tent and operable to expand the roof area in an erected position of the tent;
a support structure having an adjustable height, operable to support the first roof section in the stowed position of the tent and operable to support the first roof section in the erected position of the tent;
a floor, the floor comprising:
at least one flooring panel attached to at least one flange of at least one tie-down strip;
at least one drain;
at least one floor extension panel flexibly connected to at least one of the chassis and a fixed rigid side wall, operable to be stowed below the first roof section in a stowed position of the tent and operable to expand the floor area in an erected position of the tent; and
at least one floor support, the floor support comprising at least one of a brace and a cable, the at least one floor support operable to maintain the at least one floor extension in an erected position; and
a plurality of walls comprising at least one of flexible tent material and articulated panels, operable to be stowed below the first roof section in a stowed position of the tent and attachable to form walls between the floor and the roof.

20. The toy-hauling tent vehicle of claim 19, therein the first roof section comprises a plurality of roof subsections.

21. The toy-hauling tent vehicle of claim 19, wherein the flexible connection between each roof panel and the first roof section comprises a hinge, the hinge axis located beneath the first roof section.

22. The toy-hauling tent vehicle of claim 19, wherein the roof panels are adapted to serve as at least a portion of trailer sidewalls in the stowed position of the tent.

23. The toy-hauling tent vehicle of claim 19, wherein the support structure comprises a plurality of posts, each post having a length adjustable between a stowed length and an erected length.

24. The toy-hauling tent vehicle of claim 23, wherein a length adjustment comprises at least one of a telescopic adjustment, an articulated adjustment, a scissor-jack adjustment, and adjustment by stacked additional sections.

25. The toy-hauling tent vehicle of claim 23, wherein the plurality of posts may be extended to the erected length and the walls remain stowed, the extended posts and stowed walls enclosing a trailer having a greater interior height than in the stowed position.

26. The toy-hauling tent vehicle of claim 19, wherein the at least one flooring panel attached to at least one flange of at least one tie-down strip comprises a plurality of tie-down strips, the strips connected to form a grid, the grid forming a plurality of openings between adjacent tie-down strips, and wherein the at least one flooring panel comprises a plurality of flooring panels covering the openings in the grid.

27. The toy-hauling tent vehicle of claim 19, herein the toy space is a rectangular volume twelve feet long; 54 inches high; and 86 inches wide.

28. The toy-hauling tent vehicle of claim 19, wherein the wheeled chassis comprises at least one of a trailer chassis and a truck chassis.

29. The toy-hauling tent vehicle of claim 19, wherein the at least one tie-down strip comprises a plurality of tie-down strips, the plurality of tie-down strips further comprising a grid of tie-down strips.

* * * * *

UNITED STATES PATENT AND TRADEMARK OFFICE
CERTIFICATE OF CORRECTION

PATENT NO. : 6,722,726 B1
DATED : April 20, 2004
INVENTOR(S) : Parmer

It is certified that error appears in the above-identified patent and that said Letters Patent is hereby corrected as shown below:

<u>Column 12,</u>
Lines 8-9, should read as follows: -- The toy-hauling tent vehicle of claim 19, wherein the first roof section comprises a plurality of roof subsections. --
Lines 38-40, should read as follows: -- The toy-hauling tent vehicle of claim 19, wherein the toy space is a rectangular volume twelve feet long; 54 inches high; and 86 inches wide. --

Signed and Sealed this

Thirteenth Day of July, 2004

JON W. DUDAS
*Acting Director of the United States Patent and Trademark Office*